Feb. 20, 1951 R. W. CHAFFEE 2,542,900
PACKAGE CLOSING AND SEALING MACHINE
Filed Jan. 22, 1947 3 Sheets-Sheet 1
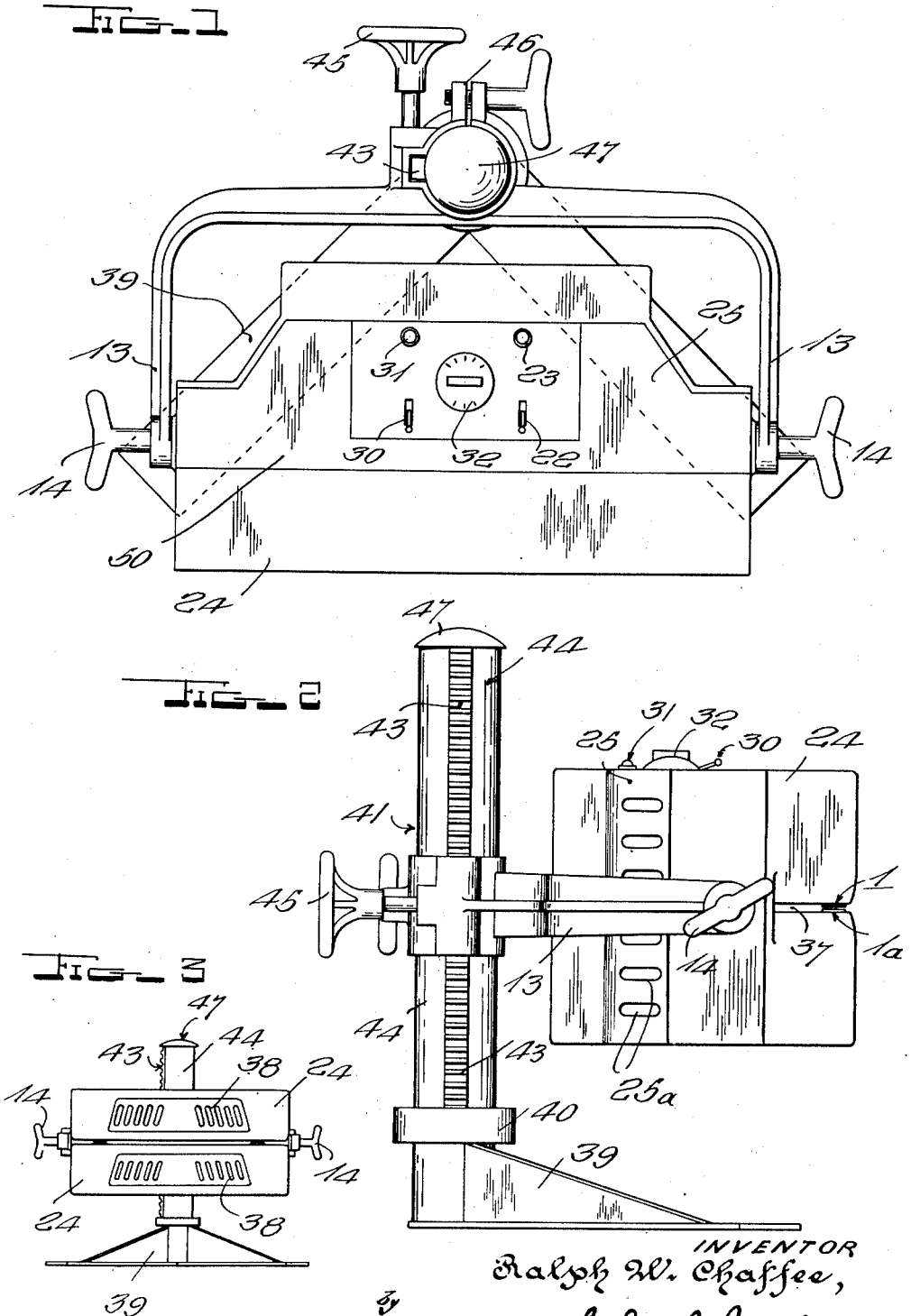
INVENTOR
Ralph W. Chaffee,
John D. Brady
ATTORNEY

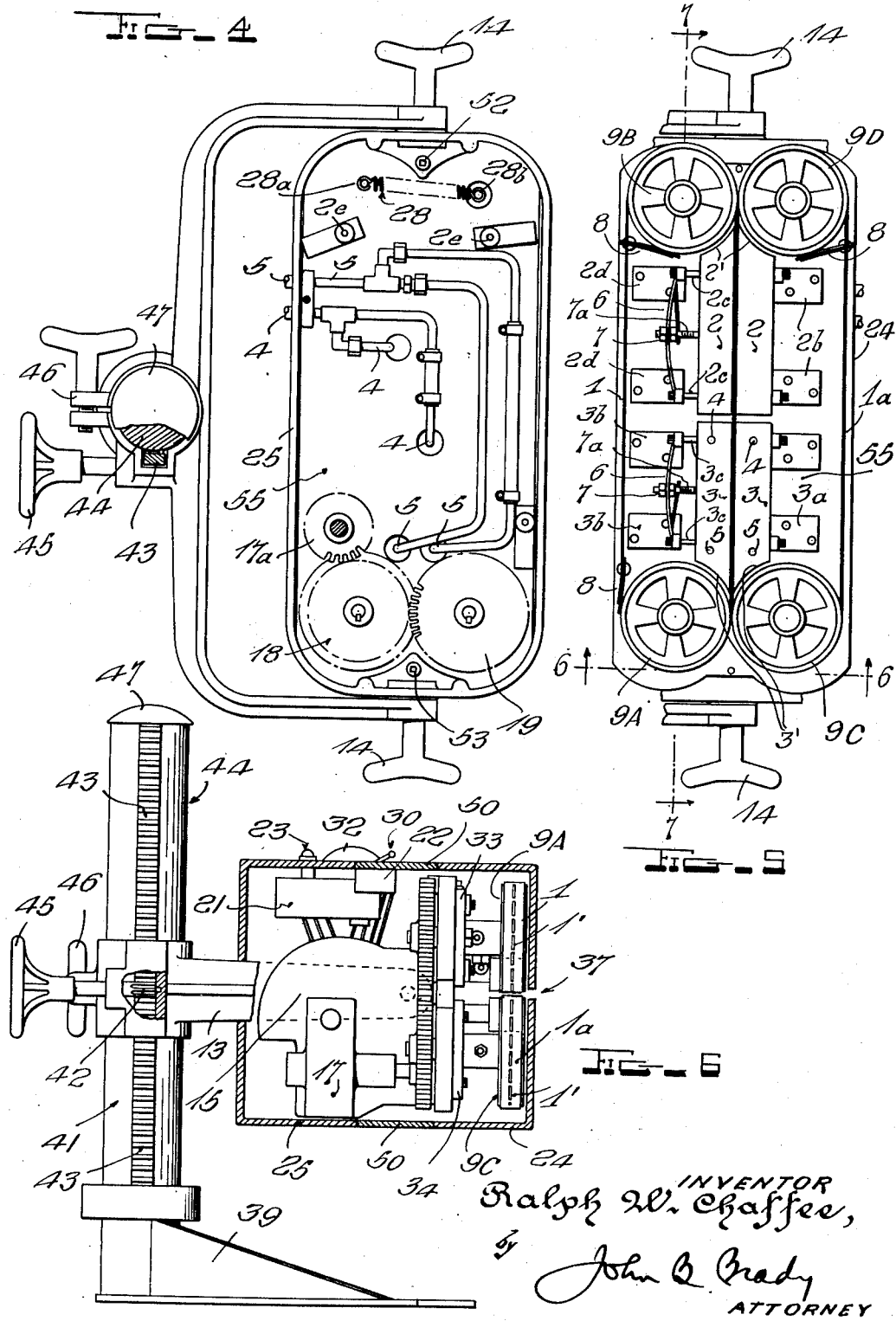

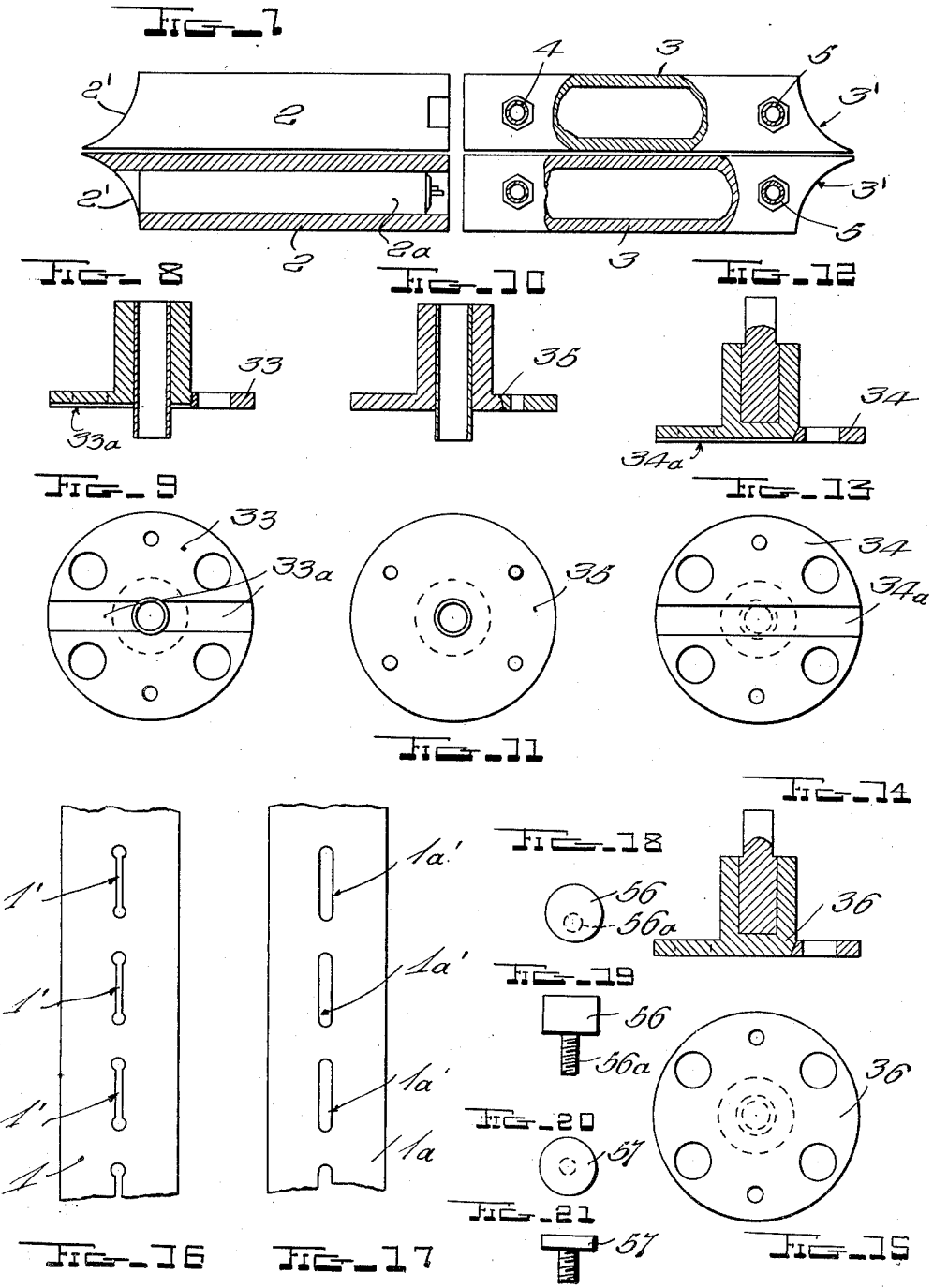

Patented Feb. 20, 1951

2,542,900

UNITED STATES PATENT OFFICE 2,542,900

PACKAGE CLOSING AND SEALING MACHINE

Ralph W. Chaffee, San Francisco, Calif.

Application January 22, 1947, Serial No. 723,566

4 Claims. (Cl. 154—42)

My invention relates broadly to sealing machines and more particularly to an improved construction of equipment for heat sealing bags under pressure.

One of the objects of my invention is to provide an improved construction of readily portable machine for heat sealing bags made from heat sealable material such as metal foil, glassine, cellophane and wax bags, etc. when filled with merchandise and ready for shipment to the market.

Another object of my invention is to provide a simplified construction of sealing machine for bags including means for effecting an abrupt change in temperature of the material of the bags in the process of sealing the bags as the bags pass through the bag sealing machine.

Another object of my invention is to provide a practical construction of combined electrical heating and water cooling means for sealing bags under pressure as filled bags are moved through a conveyor system from a filling position to a delivery position ready for the market.

Still another object of my invention is to provide a construction of heat sealing machine for bags in which the sealing operation takes place within an area substantially protected from the exterior of the machine preventing any possibility of the burning or maiming of the operator.

Still another object of my invention is to provide a compact construction of heat sealing machine in which a pair of coacting traveling belts are arranged to effect a quick grab of the protruding ends of filled bags for effecting a quick sealing of the bags under pressure in a position in which there is substantially no danger of the fingers of the operator being accidentally caught.

Still another object of my invention is to provide a construction of coacting traveling belt system in which a pair of flexible metallic belts move in coacting plane-to-plane contacting relation and which are provided with longitudinally extending slots therein which perform a dual function in eliminating work hardening of the metallic belts and enabling the belts to cperate over crowns on the pulleys for maintaining the belts in a centralized position and preventing the belts from running off of the pulleys.

A further object of my invention is to provide a construction of compact sealer including endless co-acting bands operating over sets of guide pulleys.

Other and further objects of my invention reside in the improved structural arrangement of mounting means for the sealer of my invention and the compact construction of the elements of the sealer as set forth more fully in the specification hereinafter following by reference to the accompanying drawings in which:

Figure 1 is a top plan view of the improved sealer of my invention; Fig. 2 is an end view of the sealer shown in Fig. 1; Fig. 3 is a front elevational view of the sealer on a somewhat reduced scale; Fig. 4 is a top plan view of one section of the sealer with the cover removed for illustrating the arrangement of driving means therein, portions of the view being broken away and illustrated in section; Fig. 5 is a front elevational view of the operating mechanism in the interior of the sealer, the cover being removed for illustrating the coacting belts and the manner of passing bags to be sealed through the heating and cooling sections of the sealer; Fig. 6 is a transverse sectional view taken through the sealer substantially on line 6—6 of Fig. 5 with parts of the operating mechanism illustrated in end elevation; Fig. 7 is a fragmentary view of the coacting heating and cooling pressure members which are arranged in association with the traveling belts of the sealer of my invention; certain of the heating and cooling pressure members being broken away and illustrated in section, the view being taken approximately on line 7—7 of Fig. 5; Fig. 8 is a cross-sectional view through one of the journalling means for one of the traveling belts; Fig. 9 is an elevational view of the elements shown in Fig. 8; Fig. 10 is a cross-sectional view through another of the journalling means for one of the traveling belts; Fig. 11 is an elevational view of the elements shown in Fig. 10; Fig. 12 is a cross-sectional view through another of the journalling means for the other of the traveling belts; Fig. 13 is an elevational view of the element shown in Fig. 12; Fig. 14 is a cross-sectional view of another of the journalling means for the last named traveling belt; Fig. 15 is an elevational view of the element shown in Fig. 14; Fig. 16 is a plan view of a fragmentary portion of one of the traveling belts; Fig. 17 is a plan view of a fragmentary portion of the other of the traveling belts showing the slots therein which substantially eliminate work hardening of the metallic belts and facilitates operation of the belts over the pulleys associated with the journalling means of Figs. 8–15; and Figs. 18, 19, 20 and 21 show top and side elevational views of forms of attachment means for securing the floating hubs to the center plate of the equipment.

Referring to the drawings in detail reference characters 1 and 1a designate two metallic heat conveyable bands that have the triple function of conveying the package of heat sealable material through the machine; conducting high temperature or low temperature to the material of the bag being sealed; and allowing an abrupt change in the condition of temperature. The slots or perforations 1' and 1a' in the belts as illustrated more particularly in Figs. 16 and 17 perform a dual function of eliminating work hardening of the belts and allowing the belts to operate effectively over the crowns of the mounting pulleys. The heat is generated from electrical resistor elements shown at 2a and replaceably mounted as cartridge in coacting blocks 2 shown more particularly in Figs. 5 and 7. Adjacent the blocks 2 I arrange water cooling blocks 3 both of which are hollow and which are provided with water intake connections 4 and water discharge connections 5 by which the adjacent surfaces of block 3 are maintained at low temperature while the adjacent blocks 2 are electrically maintained at high temperature.

The sets of coacting blocks 2 and 3 are arranged as illustrated in Fig. 5 within the traveling belts 1 and 1a inside of the casing 24 and 25 of the sealer. The belts 1 and 1a are mounted on pulley members 9A, 9B, 9C and 9D which are journalled interiorly of the casing of the apparatus. The pulley members 9A, 9B and 9D are mounted on floating hubs, while pulley member 9C is supported on a stationary hub. The pulley members 9A, 9B and 9D are continuously pressed toward each other by an arrangement of adjustable springs 8 supported by the casing of the apparatus and operative to tangentially contact portions of the pulleys for urging the pulleys into coacting pressure relationship whereby belts 1 and 1a are urged into plane-to-plane coacting relation. This pressure arrangement is augmented by pressure applied to the upper heated block 2 and the cool block 3 as represented in Fig. 5 by tension leaf springs 6, the effective pressure of each of which being adjustable by means of adjustable nuts 7 on screw 7a which extend from the blocks 2 and 3 as shown. Suitable supporting brackets are provided as represented at 2b for supporting one of the heated blocks 2 in fixed position while another set of brackets 2c are provided for supporting the other of the heated blocks 2 in adjustable position through slidable pins 2d that extend therefrom. Similarly one of the cooling blocks 3 is fixedly mounted by means of brackets 3a while the coacting block 3 is adjustably mounted in brackets 3b by pins 3c that are slidable therethrough. Accordingly, the belts 1 and 1a may travel between the heating blocks 2 and the cooling blocks 3 with pressure applied thereto both by reason of the continuous tendency of the pulley members 9A, 9B, and 9D to yieldably move toward each other supplemented by the tendency of the blocks 2 and blocks 3 to yieldably move toward each other.

In order to maintain the belts 1 and 1a on the pulley members 9A, 9B, 9C and 9D, the pulleys suitably crowned and the flexibility of the belts is such that the belts tend to remain centered on the pulleys continuously throughout the driving operation thereof.

In Fig. 4 I have shown the reverse side of the casing and have illustrated the distribution of the intake water connections 4 and the discharge water connections 5 leading to connections external of the casing which may be connected through flexible tubes to the cold water intake 4 and the water discharge 5. Suitable spigots are provided in these connections to control the amount of water flow to the blocks 3 and thus the temperature of the conveyors or belts 1 and 1a and the effective temperature of the seal. I have also indicated in Fig. 6 the electrical connections leading to the resistor units 2a in the heating blocks 2 as passing through the casing at 2e. Fig. 4 also shows the pulley spring pressure adjustment levers which perform a dual function of belt tensioning, for pressing the belts together, to facilitate good sealing and to facilitate loosening belts for removal from the pulleys. To further insure the yieldable contact between the coacting faces of the belts 1 and 1a I provide a coil spring 28 connected at a central point 28a of hub 9B in the casing and connected through apertures in the partition of the casing to a central position on the floating hubs of pulleys 9D and 9B, as represented at 28b.

Pulleys 9A, 9B, 9C and 9D are journalled in a very special manner, three of which are floating and one of which (9C) is stationary, it being the pulley most directly powered. Details of this pulley, I have represented in Figs. 8 and 9; Figs. 10 and 11; Figs. 12 and 13, and Figs. 14 and 15.

Driving pulley 9C is associated with stationary hub shown in Figs. 10 and 11 affixed to face plate 35 affixed to the mounting plate 55. The driving pulley 9A is associated with floating hub, Figs. 8 and 9, affixed to face plate 33 affixed to mounting plate 55. This floating hub is keyed perpendicularly to pulley 9C to facilitate pressure on pulley 9C which is stationary. Driving pulley 9D is associated with the floating hub as shown in Figs. 12 and 13 affixed to face plate 34 and 34a and keyed in a perpendicular plane from pulley 9C affixed to the mounting on the mounting plate 55 to which spring 8 is affixed which is the belt tightening medium. Pulley 9B is associated with floating hubs 14 and 15 which connects through face plate 36 to the mounting plate 55. This hub is not keyed but is permitted to travel in any direction within the limits of its fastenings. However, controlled by spring 8, the pressure it exerts is perpendicular to pulley 9A and also toward pulley 9D.

To provide limits of travel to hubs, special turned buttons 56 and 57 shown more particularly in Figs. 18-21 are used as hub fastenings but fit loosely in three of the four larger holes shown in Figs. 8, 9, 12, 13, 14 and 15. The travel of the pulleys away from the pulley perpendicularly opposite is required to permit variation in thicknesses of packages. The travel horizontally is required to facilitate proper belt tension to keep the belt on the crown of the wheel and also to permit the loosening of the belt to permit removal from the crowned pulleys.

The belts are removed by means of eccentric devices inserted in the third large hole of Figs. 8, 9, 12, 13, 14 and 15 nearest spring 8. When eccentric pressure is exerted against spring 8 nullifying its action, the belts are relieved and easily removed.

As illustrated in Figs. 18 and 19 the shank 56a of the button 56 is eccentric to the head of the button and is much smaller than the hole in the hub such as that illustrated in Fig. 8 for similar hubs. This is to permit the working up and down and sideways of the hubs but confining the hub in a parallel position by reason of the flanges on the button. To facilitate removal of the belts, I replace one of these buttons by a cam action screw. These are inserted in the hole nearest the spring to offset its action and in the case of number 33, Fig. 8, the cam would lift the wheel up away from the lower stationary pulley so that the belt will not be gripped by the two pulleys. In the case of Fig. 14, the cam action screw would be inserted in the upper left hand corner so that it would pull the wheel toward 9A and upward away from 9D. This action would release the grip between the two pulleys and also slacken the belt. This is permissible for the reason that there is no key way in this hub.

In the case of Fig. 13 or 9D pulley the only remaining action desired to remove both belts is to slacken the lower belt and consequently the cam screw can be placed in any of the larger holes and the pulley can only travel in one direction, that is, inwardly and this will slacken the belt.

As shown in Fig. 6 a driving motor 15 is mounted within the casing and connected with gear box 17 which drives through gear 17a the lower pulley driver 18 and the upper pulley driver 19. Terminal block 21 is provided within the casing and switch 22 is associated therewith and operative exteriorly of the casing for controlling the power circuit to the motor 15 with pilot light 23 arranged in the circuit thereof. A switch 30 is also arranged exteriorly to the casing for connection or disconnection of the pulley circuit to the resistor heaters 2a with pilot lamp 31 in circuit therewith. Thermostat control 32 is provided exteriorly of the casing for controlling the heat of resistor elements 2a.

In Fig. 3 I have shown in end elevation the safety cover 24 and the rear cover 25 for the apparatus. The safety cover 24 is bifurcated at the front edge thereof at 37 to permit the entry of the edges of the bags to be sealed which may be inserted between bands 1 and 1a. The rear portion of the cover 25 which houses the motor mechanism is suitably apertured at 25a to provide for adequate ventilation of the mechanism and prevent over-heating of the sealer when in long and continued use. The front cover 24 is ventilated through slots 38 for permitting circulation of air through the sealer. The front cover 24 carries swivel means thereon for providing the trunnion mounting at opposite ends of the casing through yoke 13 and wing nuts 14. The yoke 13 is provided with a central portion with which the bench mount 39 is associated. The bench mount 39 is provided with a bench mount swivel 40 on which the elevator mechanism 41 is arranged. The elevator mechanism consists of a pinion gear 42 carried by the central portion of yoke 13 and adapted to mesh with the vertically extending rack 43 on standard 44 carried by the swivel 40. Pinion 42 is operated by hand adjustment wheel 45 to raise and lower the sealer to a proper position adjacent the conveyor belt carrying the filled bags to the sealing position. The position of the sealer having once been determined is set by clamping means 46 adapted to grip yoke 13 into binding relation with the standard 44. A suitable cap 47 is mounted on the top of standard 44. Thus the casing may be angularly shifted, or transversely moved through bench mount swivel 40 and vertically elevated or lowered to the position at which protruding ends of filled bags carried by a progressively moving conveyor may enter between the belts 1 and 1a and first be subjected to pressure and heat between belts 1 and 1a adjacent blocks 2 and then the temperature abruptly changed by the passage united edges of the bags between belts 1 and 1a adjacent the cool zones at blocks 3 for chilling the heated joint and effect a firm seal thereof.

The slotted or perforated belts 1 and 1a insure the quick application of heat from blocks 2 to the compressed material of the bags through the alignable slots or perforations 1' or 1a' shown in Figs. 16 and 17. At the same time these perforations impart sufficient transverse flexibility to the belts 1 and 1a to insure maintenance of the belts on the crowned pulleys 9A, 9B, 9C and 9D. The perforations also insure the quick application of low temperature to the sealing ends of the bags.

The heating and cooling means which I arrange inside of the envelopes formed by each of the moving belts have tapered extremities which extend to a position closely conforming to the contour of the pulleys and the junction thereof with the belts. In the case of the heating means these projections are indicated at 2' on the blocks 2, the projections being curved to fit closely adjacent the belts. In the case of the cooling blocks 3 the tapered extensions are indicated at 3' closely fitting into the space between the belts and the surfaces of the pulleys 9A and 9C. Thus the heating medium and the cooling medium are both maintained immediately adjacent the belts and the supports thereof for most effectively employing the low and high temperatures established by the cooling or heating means.

The three part casing constituted by the front safety cover 24 and the rear cover 25 are secured together on opposite sides of the center casting member 50 by means of bolt members 52 and 53 which extend through apertures in the rear cover 25 and enter aligned screw threaded recesses in the front safety cover 24. Assembly and disassembly of the equipment may thus be readily effected.

Overheating of the equipment is automatically prevented by the provision of the thermostat adjacent the blocks 2 as heretofore explained. Thus the equipment, if overheated by long and extensive use, is allowed to cool automatically by the operation of the thermostat opening the power circuit. When the equipment has been restored to normal operating temperature, the power circuit is again completed by automatic operation of the thermostat.

The apparatus of my invention has been found to be very practical in construction and successfully used in operation. While I have described one of the preferred embodiments of my invention I realize that modifications may be made and I desire that it be understood that no limitations upon my invention are intended other than may be imposed by the scope of the appended claims.

What I claim as new and desire to secure by Letters Patent of the United States is as follows:

1. In a bag closing and sealing machine, a casing, pairs of mounting means adjustably mounted at each end of said casing, a pair of coacting traveling band members mounted for continuous movement within said casing on said mounting means, said band members having mutually contacting engaging surfaces, and heating and cooling units associated with said band, said heating units comprising members yieldably confined adjacent the inside surface of each of said bands and extending from a substantially central position in said casing in substantially continuous contacting relation with the band members adjacent the mounting means therefor, said cooling units comprising members establishing yieldable substantially continuous contacting relation with the inner faces of said bands and extending from said substantially central position in said casing to a position substantially adjacent the other pair of mounting means for said bands.

2. In a bag closing and sealing machine, a casing, a pair of rotatably journalled rotor members mounted adjacent opposite ends of said casing, a pair of coacting relatively flat traveling bands carried by said rotor members and moving in substantially continuous contacting relation and sets of pairs of heating and cooling units mounted on said casing and establishing yieldable slidable contacting relation with the inner surfaces of each of said bands, each of said heating and cooling units having tapered ends extending into contacting relation with said traveling bands to a position substantially adjacent said rotor members for heating or cooling said bands continuously from a substantially central position thereof to the position of support thereof by said rotor members.

3. In a bag closing and sealing machine, a casing, a pair of rotatably journalled rotor members mounted adjacent opposite ends of said casing, a pair of coacting relatively flat traveling bands carried by said rotor members and moving in substantially continuous contacting relation and sets of pairs of heating and cooling units mounted on said casing and establishing yieldable contacting relation with the inner surfaces of each of said bands, each of said heating and cooling units having tapered ends extending into contacting relation with said traveling bands to a position substantially adjacent said rotor members for heating or cooling said bands continuously from a substantially central position thereof to the position of support thereof by said rotor members, said heating units comprising heat conducting casings each having a central open core therein for the insertion or removal of the replaceable heating element therein.

4. A traveling belt system comprising sets of coacting pulley members peripherally aligned in longitudinally spaced positions, crowned surfaces on said pulleys, a thermally conductive metallic belt looped around each set of said pulleys and maintained thereon by the crowned surfaces of said pulleys for continuous movement in close juxta-position to each other for the introduction, clamping, and conveying of work therebetween, said metallic belts being perforated along the length thereof for substantially reducing work hardening of the metallic belts.

RALPH W. CHAFFEE.

REFERENCES CITED

The following references are of record in the file of this patent:

UNITED STATES PATENTS

| Number | Name | Date |
|---|---|---|
| 2,175,274 | Mertis | Oct. 10, 1939 |
| 2,248,038 | Adams | July 8, 1941 |
| 2,392,695 | Rohdin | Jan. 8, 1946 |

OTHER REFERENCES

Doughboy, published by Dairyland Farmer Press, New Richmond, Wisconsin, pp. 12 and 13, received 12-9-46.